July 8, 1952 H. KAPPELER 2,602,600

COMBINATION OF MAGNETIC AND DISK PLAYBACK APPARATUS

Filed Dec. 30, 1947

Inventor
Hans Kappeler
By Robert E. Burns
Attorney

Patented July 8, 1952 2,602,600

UNITED STATES PATENT OFFICE 2,602,600

COMBINATION OF MAGNETIC AND DISK PLAYBACK APPARATUS

Hans Kappeler, Soleure, Switzerland, assignor to Autophon Aktiengesellschaft, Soleure, Switzerland Application December 30, 1947, Serial No. 794,599
In Switzerland April 15, 1946

Section 1, Public Law 690, August 8, 1946
Patent expires August 15, 1966

3 Claims. (Cl. 242—54)

When combining magnetic and disc playback apparatus, the driving motor of the disc reproducer is also used for the drive of the magnetic apparatus, preferably in such a manner that the turntable is simultaneously used as take-up reel by providing the rim of the turntable with a groove in which the magnetic sound carrier could be wound.

The driving motor is arranged in such a manner as to be uncoupled from the shaft of the take-up turntable and to be coupled with the shaft of the supply reel for the purpose of rewinding the magnetic sound carrier. The driving motor may be coupled with the shaft of the take-up reel or of the supply reel respectively by means of a gear or a worm wheel or by means of a V-belt. In any case, the shaft and at least part of the drive are driven during the rewinding operation at a higher rewinding speed, producing noise and increased wear.

The present invention relates to a combination of magnetic and disc playback apparatus, the take up reel for the magnetic sound carrier of the magnetic reproducer being so shaped as to be used simultaneously as the turntable for discs, the magnetic sound carrier being unwound during playback from a supply reel and wound on to a take up reel driven by a motor, characterized in that for the purpose of rewinding the magnetic sound carrier on to the supply reel, the take-up reel may be uncoupled from its shaft for free running on the latter and in that a separate motor operative during rewinding is provided for the drive of the supply reel.

The drawing illustrates by way of example an executional form of the apparatus according to the invention.

Figure 3:
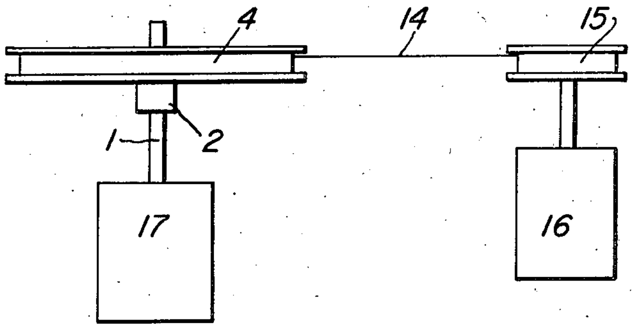
Fig. 3 is a schematic representation of the whole apparatus.
Figure 1:
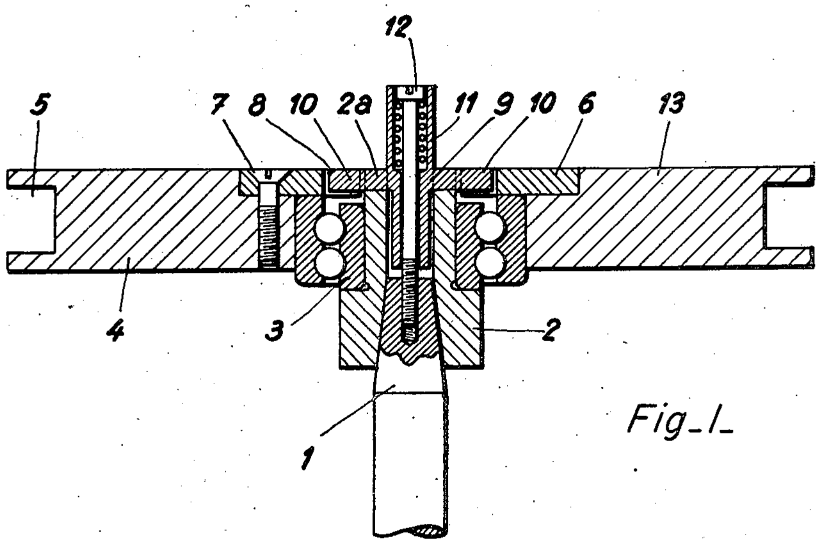
Fig. 1 shows a section through the fixation of the take-up wheel.
Figure 2:
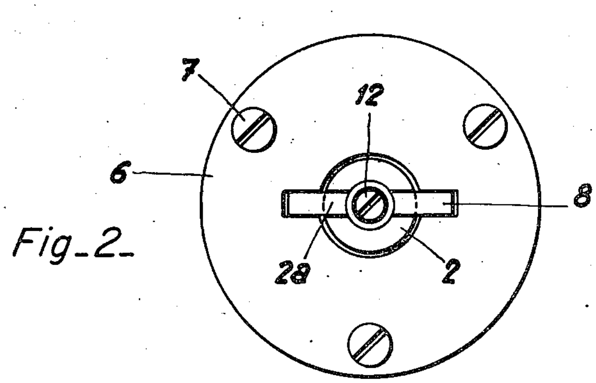
Fig. 2 shows a plan of the coupling.

On the tapered end of the driving shaft 1 of motor 17 of the take-up reel is fixed a sleeve 2, the front face of which comprises a diametrically-arranged slot 2*a* and on the shoulder of which rests the ball bearing 3, which is centered in the take-up reel 4. The take-up reel 4 comprises at its circumference a groove 5 for receiving the magnetic sound carrier 14. It further comprises a central recess in which is fixed the coupling disc 6 by means of screws 7. This coupling disc possesses a central hole and a diametrally-arranged slot 8, as shown in Fig. 2. The coupling piece 9 possesses two diametral arms 10 which fit into the slot 8 of the coupling disc 6 and into the slot 2*a* of sleeve 2. The cylindrical portion 11 of the coupling piece 9 is furthermore knurled for increased handiness and comprises inside an opening into which is inserted a compression spring held in position by the screw 12, which simultaneously serves as a guide of the coupling piece 9. The top surface of the take-up reel is provided with felt or velvet and it serves as support for the discs, which are centered by means of the cylindrical portion 11.

When the take-up reel 4 should be coupled with the shaft 1 for the purpose of playback of the magnetic sound carrier, the arms 10 of the coupling piece 9 fit into the slot 8 of the coupling disc 6 and into slot 2*a* of sleeve 2, thus the take-up reel and the driving shaft 1 being coupled. Should the magnetic sound carrier 14 be rewound on to the supply reel 15, the coupling piece 9 is extracted by means of the cylindrical portion 11 from the slots 8, 2*a* and turned through 90°, in order that it may rest with its arms 10 on the front face of sleeve 2, thus the take-up reel 4 being enabled to rotate free on the ball bearing 3. Through this arrangement, it is made possible that the driving shaft 1 is at rest during the rewinding operation. The supply reel is being driven during rewinding by a separate motor 16 provided for this purpose.

What I claim is:

1. In combination, magnetic and disc playback apparatus, a magnetic sound carrier, a supply reel, and a take-up reel for said magnetic sound carrier, said take-up reel having a turntable portion for supporting disc records, including means for holding said discs centered on the turntable, a motor for driving the supply reel, a separate motor for driving the take-up reel, driving connections between said latter motor and the take-up reel including a drive shaft rotated by the motor, bearing means rotatably supporting the take-up reel on said shaft while supporting the take-up reel against axial movement on the shaft, and a coupling member releasably coupling the take-up reel to said shaft for rotation therewith, said coupling member being movable relative to both the shaft and the take-up reel from an operative position in which the shaft and take-up reel are coupled, and an inoperative position in which the take-up reel is rotatably supported on said shaft by said bearing.

2. Apparatus according to claim 1, in which a portion of said coupling member projects up above the turntable portion of the take-up reel, provides a handle for moving said coupling member, and also constitutes said means for holding said discs centered on the turntable.

3. In combination of magnetic and disc playback apparatus, a magnetic sound carrier, a take-up reel for said sound carrier having a turntable portion for discs, a take-up reel motor in driving connection with said take-up reel, a supply reel, said magnetic sound carrier being arranged to be unwound during playback from said supply reel and wound up to said take-up reel, a shaft, an antifriction bearing, said take-up reel being pivotally mounted on said shaft by means of said antifriction bearing, a sleeve fixed to said shaft having a diametrically arranged slot, a diametrically arranged slot in said take-up reel, a coupling piece possessing two diametrical arms fitting into said slots for coupling said shaft to said take-up reel and removable from said slots in order to allow free running of said take-up reel on said shaft for the purpose of rewinding said magnetic sound carrier on to said supply reel, and a supply reel motor in driving connection with said supply reel and operative during rewinding.

HANS KAPPELER.

REFERENCES CITED

The following references are of record in the file of this patent:

UNITED STATES PATENTS

| Number | Name | Date |
|---|---|---|
| 1,142,384 | Tiffany | June 8, 1915 |
| 1,155,776 | Washburn | Oct. 5, 1915 |
| 1,713,277 | Goldberg et al. | May 14, 1929 |
| 2,048,382 | Holden | July 21, 1936 |